United States Patent
Wu et al.

(10) Patent No.: US 9,146,627 B2
(45) Date of Patent: Sep. 29, 2015

(54) LIFT DETECTION METHOD FOR OPTICAL MOUSE AND OPTICAL MOUSE WITH LIFT DETECTION FUNCTION

(75) Inventors: Chih-Yen Wu, Hsinchu County (TW); Yao-Hsuan Lin, Hsinchu County (TW); Yen-Min Chang, Hsinchu County (TW)

(73) Assignee: PIXART IMAGING INC., Hsinchu County (TW)

( * ) Notice: Subject to any disclaimer, the term of this patent is extended or adjusted under 35 U.S.C. 154(b) by 370 days.

(21) Appl. No.: 13/015,113

(22) Filed: Jan. 27, 2011

(65) Prior Publication Data
US 2012/0038554 A1 Feb. 16, 2012

(30) Foreign Application Priority Data
Aug. 13, 2010 (TW) ............................... 99127184 A

(51) Int. Cl.
G06F 3/042 (2006.01)
G06F 3/038 (2013.01)
G06F 3/0354 (2013.01)

(52) U.S. Cl.
CPC ............ G06F 3/038 (2013.01); G06F 3/03543 (2013.01)

(58) Field of Classification Search
CPC ......... G06F 3/03; G06F 3/0304; G06F 3/033; G09G 5/00
USPC .................................... 345/156–184
See application file for complete search history.

(56) References Cited

U.S. PATENT DOCUMENTS

| | | | |
|---|---|---|---|
| 7,189,985 B2 * | 3/2007 | Xie et al. | 250/559.29 |
| 7,295,186 B2 | 11/2007 | Brosnan | |
| 7,442,916 B2 | 10/2008 | Lee et al. | |
| 7,792,256 B1 * | 9/2010 | Arledge et al. | 379/102.01 |
| 8,138,488 B2 * | 3/2012 | Grot | 250/559.29 |
| 8,334,844 B2 * | 12/2012 | Utsunomiya | 345/166 |
| 2004/0135825 A1 * | 7/2004 | Brosnan | 345/857 |
| 2006/0007155 A1 * | 1/2006 | Raynor et al. | 345/166 |
| 2008/0061219 A1 * | 3/2008 | Lee et al. | 250/221 |

* cited by examiner

*Primary Examiner* — Ilana Spar
*Assistant Examiner* — Paras D Karki
(74) *Attorney, Agent, or Firm* — Locke Lord LLP; Tim Tingkang Xia, Esq.

(57) ABSTRACT

A lift detection method for an optical mouse and an optical mouse with a lift detection function are presented. An average brightness value of pixels captured by part of sensing units of an image sensor is computed after each scanning, and two average brightness values obtained from two adjacent times of scanning are compared, to determine a brightness change of the pixels in each scanning, thereby acquiring a placing state of the optical mouse accordingly.

9 Claims, 6 Drawing Sheets

LIFT DETECTION METHOD FOR OPTICAL MOUSE AND OPTICAL MOUSE WITH LIFT DETECTION FUNCTION

CROSS-REFERENCE TO RELATED APPLICATIONS

This non-provisional application claims priority under 35 U.S.C. §119(a) on Patent Application No(s). 099127184 filed in Taiwan, R.O.C. on Aug. 13, 2010, the entire contents of which are hereby incorporated by reference.

BACKGROUND OF THE INVENTION

1. Field of Invention

The present invention relates to an optical mouse, and more particularly to a lift detection method for an optical mouse and an optical mouse with a lift detection function.

2. Related Art

With the increasing popularization of personal computers, various types of computer peripheral products are increasingly proposed to meet different requirements of the consumers, among which the mouse capable of controlling the motion of the cursor on the computer screen is the most widely used. According to its motion detection modes, the mouse can be classified into two types, namely, non-optical mechanism and optical mechanism. The non-optical mechanism performs motion detection through the rolling of the spherical scroll wheel in the bottom portion of the mouse. The optical mechanism performs motion detection by capturing an image reflected by the desktop with an image sensor.

The mouse using the optical mechanism is generally referred to as an optical mouse. In the optical mouse, an optical source, for example, a light emitting diode (LED), formed at the bottom side of the mouse emits light on the desktop, and a 2D image sensor is used to capture a special pattern formed by the micro texture of the desktop irradiated by the optical source. Thus, the change of the captured image pattern caused by the motion of the mouse is converted into a displacement according to a corresponding image processing mechanism, so as to appropriately reflect the amount of motion and direction of the cursor on the computer screen.

When the optical mouse is lifted from the working plane, an error may occur. That is to say, when the optical mouse in an inactive state is lifted from the working plane, the image sensor may detect an image formed by an external optical source and irrelevant to the motion of the optical mouse, and compute a false motion value according to the image irrelevant to the motion. Further, due to the detection of the image irrelevant to the motion of the optical mouse, the optical mouse in a power-saving state is activated by mistake, thus wasting the power consumption.

In the current designs of the lift detection function of the optical mouse, for some designs, an additional optical source and optical sensor are disposed near the original optical module, to detect the distance between the original optical mouse and the working plane, thereby determining whether the original optical mouse is lifted from the working plane. However, in the above design method, an additional set of optical sensing modules are added, thereby increasing the manufacturing cost of the optical mouse, and as most of the added optical sensing modules are formed by electronic components, the lifetime of the mouse is limited, so that the optical mouse still needs to be improved.

SUMMARY OF THE INVENTION

Accordingly, the present invention is a lift detection method for an optical mouse and an optical mouse with a lift detection function, so as to solve the problems in the prior art.

The present invention provides a lift detection method for an optical mouse, which is applicable to an optical mouse.

The optical mouse comprises an optical source and an image sensor. The image sensor has a sensing surface formed by N sensing units, and the image sensor uses light rays generated by the optical source to continuously scan and capture a plurality of images corresponding to an optical field of the sensing surface, in which N is an integer greater than 1.

The lift detection method for the optical mouse comprises: computing an average brightness value of K pixels captured by K sensing units in N sensing units from an $i^{th}$ scanning, to obtain a first average brightness value; computing an average brightness value of the K pixels captured by the K sensing units from an $(i+1)^{th}$ scanning, to obtain a second average brightness value; and determining a brightness change of the K pixels in the two images captured from the $i^{th}$ scanning and the $(i+1)^{th}$ scanning according to the first average brightness value and the second average brightness value, in which when the brightness change is from dark to bright, a first signal indicating that a placing state of the optical mouse is a lift state is output.

In the method, K is a positive integer smaller than N, and i is a positive integer.

The present invention further provides an optical mouse with a lift detection function, which comprises an optical source, an image sensor, and a processing module.

The image sensor has a sensing surface formed by N sensing units, in which N is an integer greater than 1.

The image sensor uses light rays generated by the optical source to continuously scan and capture a plurality of images corresponding to an optical field of the sensing surface.

The processing module selectively outputs a first signal and a second signal according to a brightness change of corresponding K sensing units in the N sensing units between two images captured by the image sensor from an $i^{th}$ scanning and an $(i+1)^{th}$ scanning, in which K is a positive integer smaller than N, and i is a positive integer.

When the brightness change is from dark to bright, the processing module outputs the first signal indicating that a placing state of the optical mouse is a lift state; and when the brightness change is from bright to dark, the processing module outputs the second signal indicating that the placing state of the optical mouse restores to a normal use state.

In view of the above, according to the lift detection method for the optical mouse and the optical mouse with the lift detection function of the present invention, the sensing values of part of the sensing units are used to determine whether the optical mouse is lifted. Moreover, when it is detected that the optical mouse is in the lift state, the first signal is generated, and the optical mouse stops the output of a displacement track; and when it is detected that the optical mouse restores to the normal use state, the second signal is generated, and the optical mouse recovers the output of the displacement track. In this manner, whether the optical mouse is lifted is determined without increasing the hardware cost, and false determination caused by the lift of the optical mouse is avoided.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

Figure 1:
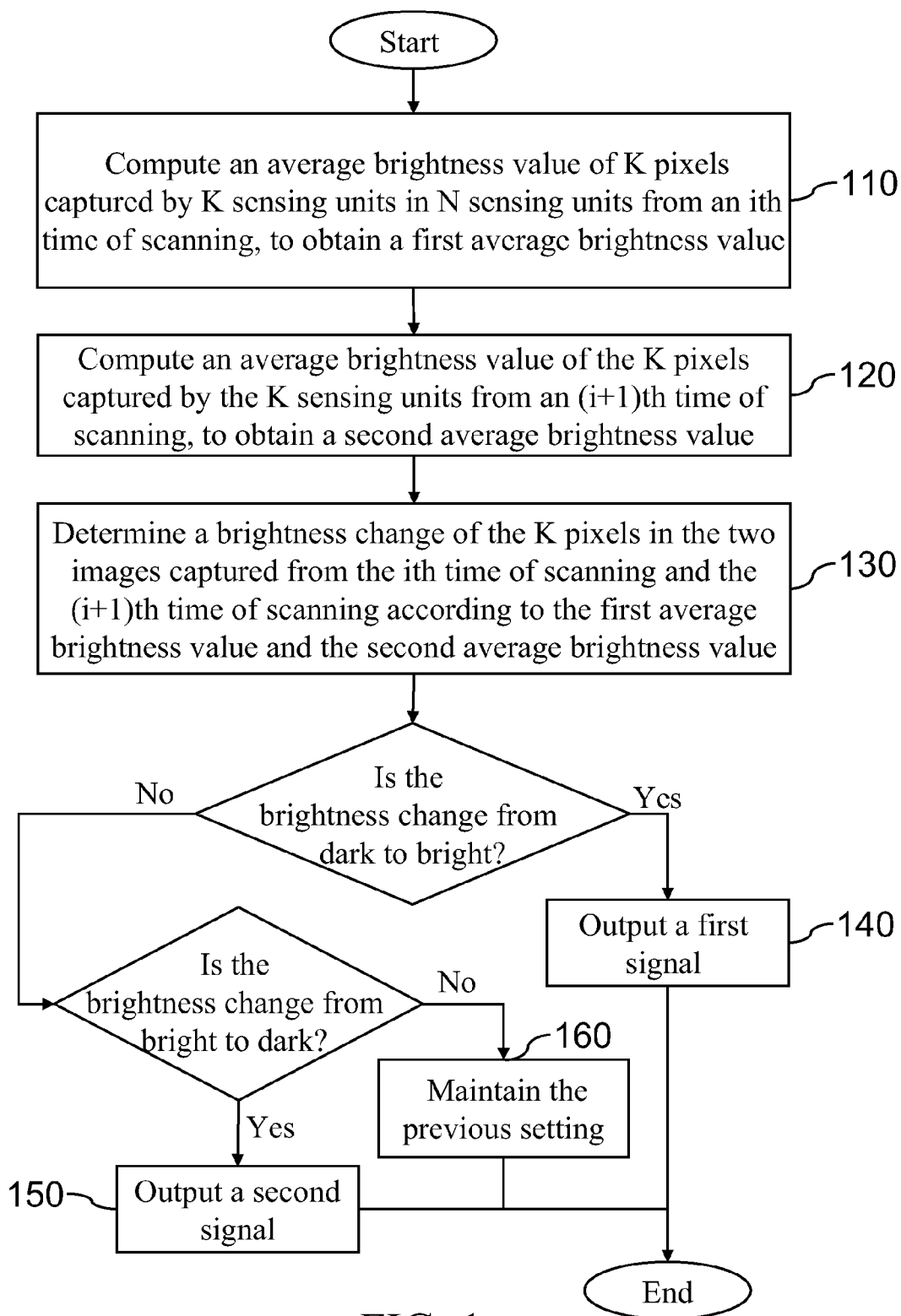
FIG. 1 is a flow chart of a lift detection method for an optical mouse according to a first embodiment of the present invention.
Figure 2:
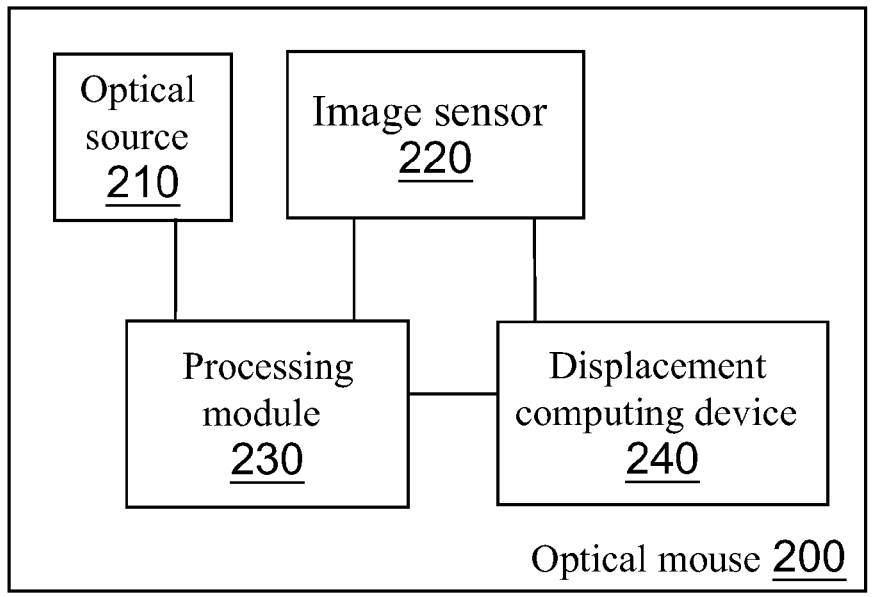
FIG. 2 is a schematic view of an optical mouse with a lift detection function according to the first embodiment of the present invention.

FIG. 1 is a flow chart of a lift detection method for an optical mouse according to a first embodiment of the present invention. FIG. 2 is a schematic view of an optical mouse with a lift detection function according to the first embodiment of the present invention.

Referring to FIGS. 1 and 2, the lift detection method for the optical mouse is applicable to an optical mouse 200.

The optical mouse 200 comprises an optical source 210 and an image sensor 220.

The image sensor 220 has a sensing surface formed by N sensing units, and the image sensor 220 uses light rays generated by the optical source 210 to continuously scan and capture a plurality of images corresponding to an optical field of the sensing surface, in which N is an integer greater than 1.

The optical mouse 200 further comprises a processing module 230. The processing module 230 is composed of one or more processors.

After each scanning made by the image sensor 220, the processing module 230 computes an average brightness value of K pixels captured by K sensing units in N sensing units (Steps 110 and 120), and compares two average brightness values obtained from two adjacent times of scanning, to determine a brightness change of the K pixels at the same positions in the images captured from each scanning (Step 130). The processing module 230 computes the average brightness value of the K pixels at the same positions in the images captured from each scanning. In addition, the K sensing units may be located on the same sensing line.

Moreover, when the brightness change is from dark to bright, the processing module 230 outputs a first signal indicating that a placing state of the optical mouse 200 is a lift state (Step 140).

In other words, the processing module 230 computes an average brightness value of K pixels captured by K sensing units in N sensing units from an $i^{th}$ scanning, to obtain a first average brightness value (Step 110), and computes an average brightness value of the same K pixels captured by the K sensing units from an $(i+1)^{th}$ scanning, to obtain a second average brightness value (Step 120). After obtaining the first average brightness value and the second average brightness value, the processing module 230 determines a brightness change of the K pixels at the same positions in the two images captured from the $i^{th}$ scanning and the $(i+1)^{th}$ scanning according to the first average brightness value and the second average brightness value (Step 130). When the brightness change is from dark to bright, the processing module 230 outputs a first signal indicating that a placing state of the optical mouse 200 is a lift state (Step 140).

In the above steps, K is a positive integer smaller than N, and i is a positive integer.

The optical mouse 200 further comprises a displacement computing device 240. In normal operation, the displacement computing device 240 receives the images captured by the image sensor 220, and computes a displacement corresponding to the image captured from each scanning according to the images, that is, the displacement of the optical mouse 200.

Figure 3:
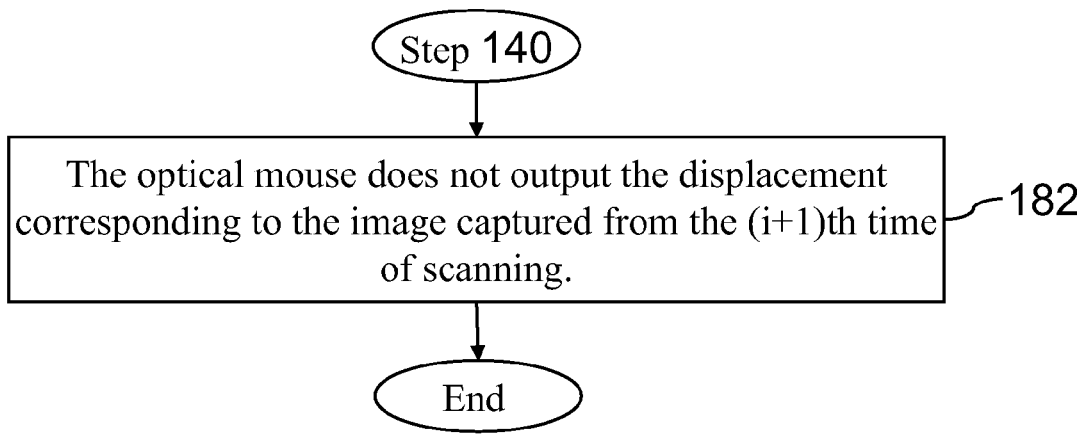
FIG. 3 is a partial flow chart of a lift detection method for an optical mouse according to a second embodiment of the present invention.

When the placing state of the optical mouse 200 is the lift state, the processing module 230 controls the operation of the displacement computing device 240 according to the first signal, so that the optical mouse 200 does not output the displacement corresponding to the image captured from the $(i+1)^{th}$ scanning (Step 182), as shown in FIG. 3. Here, the operation of the displacement computing device 240 may be suspended according to the first signal, so that the displacement computing device 240 does not generate the displacement corresponding to the image captured from the $(i+1)^{th}$ scanning, and thus the optical mouse 200 does not output the displacement corresponding to the image captured from the $(i+1)^{th}$ scanning. Alternatively, the output of the displacement computing device 240 may be interrupted according to the first signal, so that the optical mouse 200 does not output the displacement corresponding to the image captured from the $(i+1)^{th}$ scanning.

In other words, the K sensing units can not only detect whether the optical mouse 200 is in the lift state, but also detect the displacement of the optical mouse 200.

However, the K sensing units may also be particularly designed to detect whether the optical mouse 200 is in the lift state, without detecting the displacement of the optical mouse 200. In this case, the K sensing units particularly used for detecting whether the optical mouse 200 is in the lift state are configured at edges of configuration areas in the N sensing units.

Figure 4:
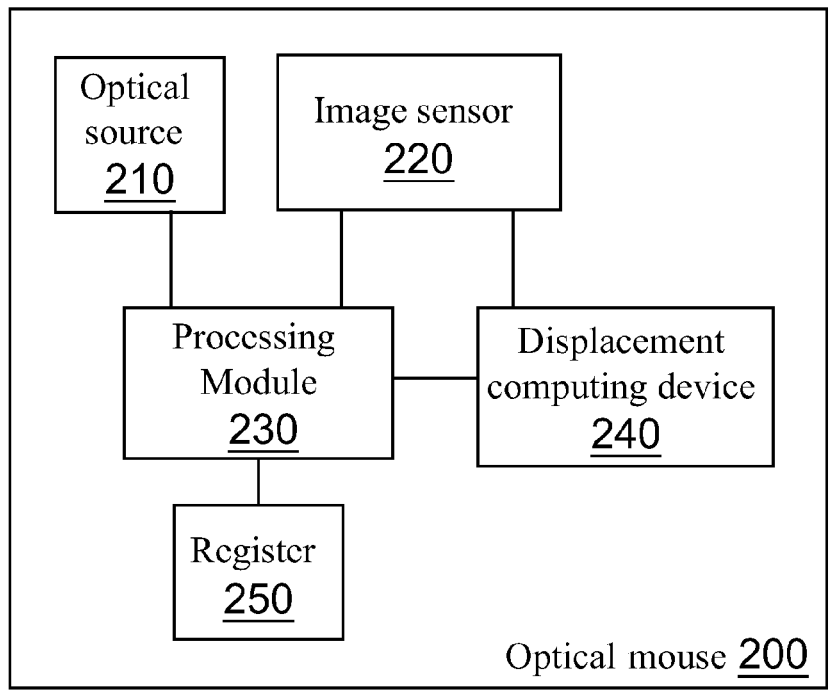
FIG. 4 is a schematic view of an optical mouse with a lift detection function according to the second embodiment of the present invention.

Referring to FIG. 4, the optical mouse 200 further comprises a register 250. The register 250 may record the placing state of the optical mouse 200. In other words, the register 250 stores a flag signal indicating the placing state of the optical mouse 200. For example, when the placing state of the optical mouse 200 is the lift state, the flag signal is set to 1; and when the placing state of the optical mouse 200 is the normal use state, the flag signal is set to 0.

Figure 5:
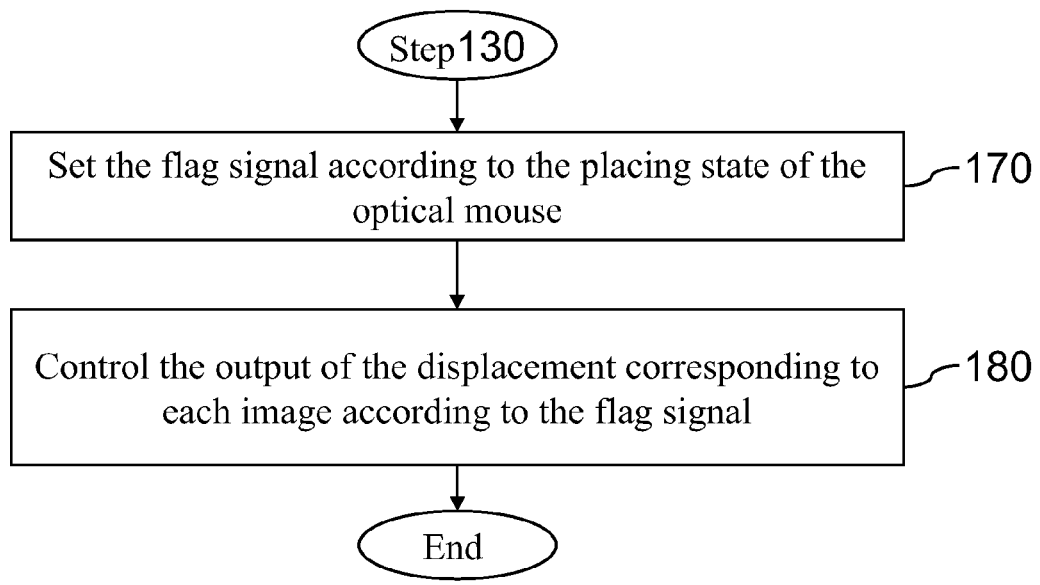
FIG. 5 is a partial flow chart of a lift detection method for an optical mouse according to a third embodiment of the present invention.

Referring to FIG. 5, after obtaining the average brightness value of the K pixels captured from each scanning (Steps 110 and 120), the processing module 230 determines the brightness change of the K pixels according to the computed average brightness value, so as to acquire the placing state of the optical mouse (Step 130).

After acquiring the placing state of the optical mouse, the processing module 230 further sets the flag signal of the register 250 according to the acquired placing state of the optical mouse 200 (Step 170), and controls the operation of the displacement computing device 240 according to the flag signal recorded in the register 250, so as to control the output of the displacement corresponding to each image (Step 180).

The following setting is taken as an example, in which when the placing state of the optical mouse 200 is the lift state, the flag signal is set to 1; and when the placing state of the optical mouse 200 is the normal use state, the flag signal is set to 0.

Figure 6:
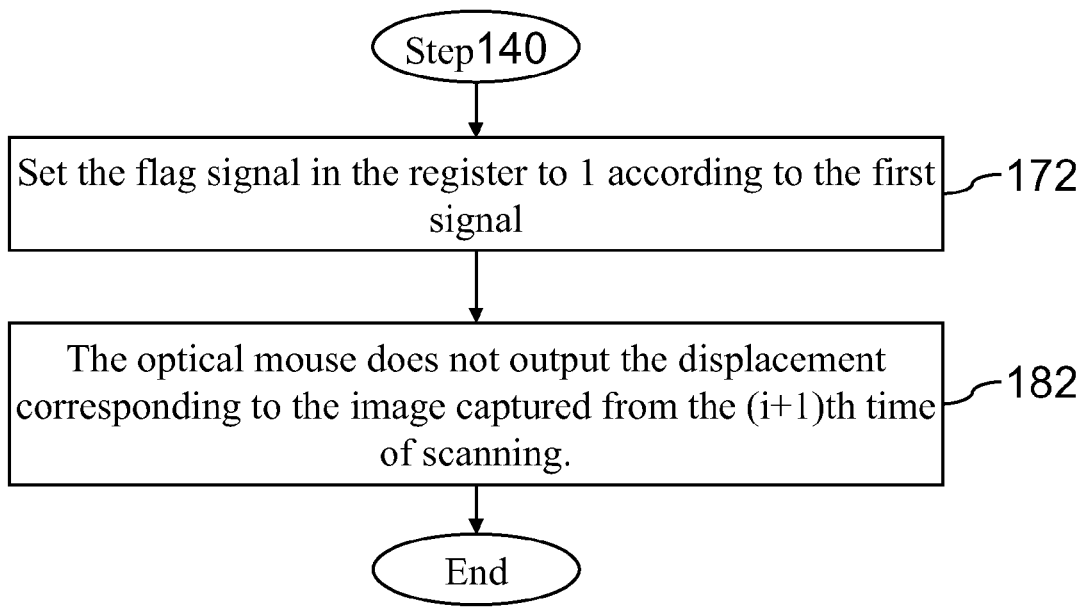
FIG. 6 shows an embodiment of Steps 170 and 180 in FIG. 5.

Referring to FIG. 6, when the brightness change is from dark to bright, the processing module 230 outputs the first signal indicating that the placing state of the optical mouse 200 is the lift state (Step 140), and sets the flag signal in the register 250 to 1 according to the first signal (Step 172). Here, the processing module 230 controls the operation of the displacement computing device 240 according to the flag signal, so that the optical mouse 200 does not output the displacement corresponding to the image captured from the (i+1)$^{th}$ scanning (Step 182).

Again referring to FIG. 1, when the brightness change is from bright to dark, the processing module 230 outputs a second signal indicating that the placing state of the optical mouse 200 restores to the normal use state (Step 150).

Figure 7:
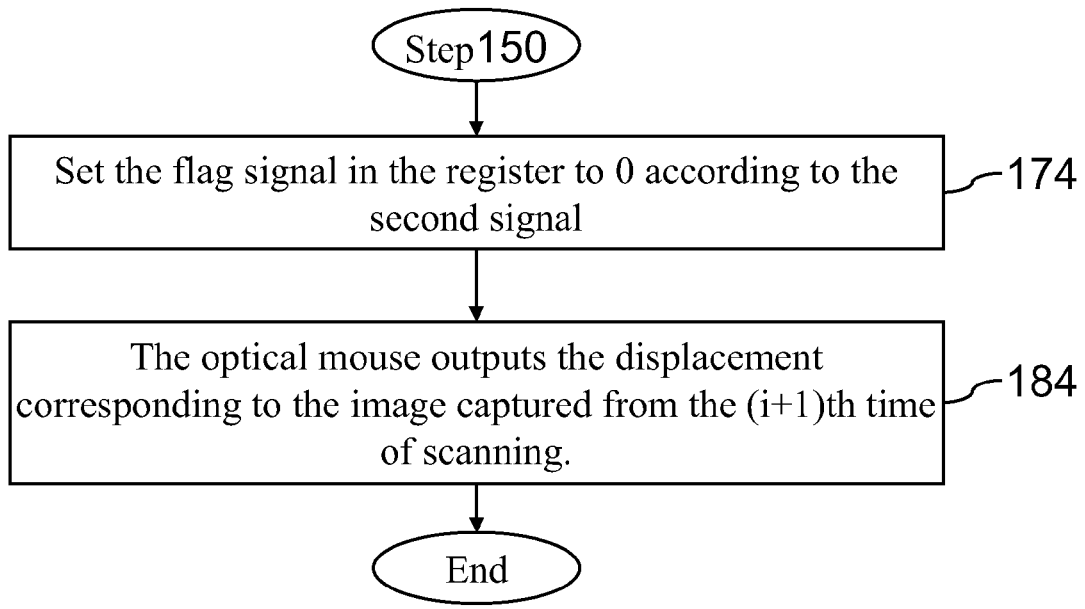
FIG. 7 shows another embodiment of Steps 170 and 180 in FIG. 5.

Further referring to FIG. 7, the processing module 230 sets the flag signal in the register 250 to 0 according to the second signal (Step 174), and controls the operation of the displacement computing device 240 according to the flag signal, so that the optical mouse 200 outputs the displacement corresponding to the image captured from the (i+1)$^{th}$ scanning (Step 184).

Again referring to FIG. 1, when the brightness change does not occur, the previous setting corresponding to the placing state of the optical mouse 200 is maintained, that is, the flag signal in the register 250 is not reset (Step 160).

In addition, the placing state of the optical mouse 200 may be determined through a preset threshold in Step 130.

Figure 8:
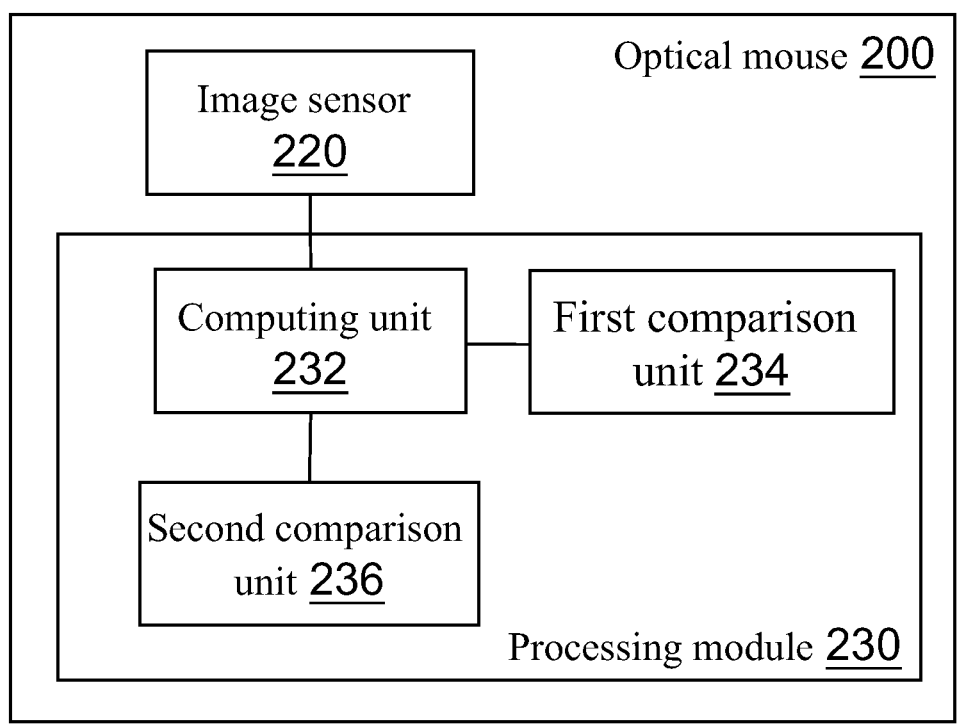
FIG. 8 shows an embodiment of a processing module in FIGS. 2 and 4.

Referring to FIG. 8, the processing module 230 comprises a computing unit 232, a first comparison unit 234, and a second comparison unit 236. The computing unit 232 is electrically connected to the first comparison unit 234 and the second comparison unit 236. The processing module 230 also comprises a control unit (not shown) to control the operation of internal and external elements.

Figure 9:
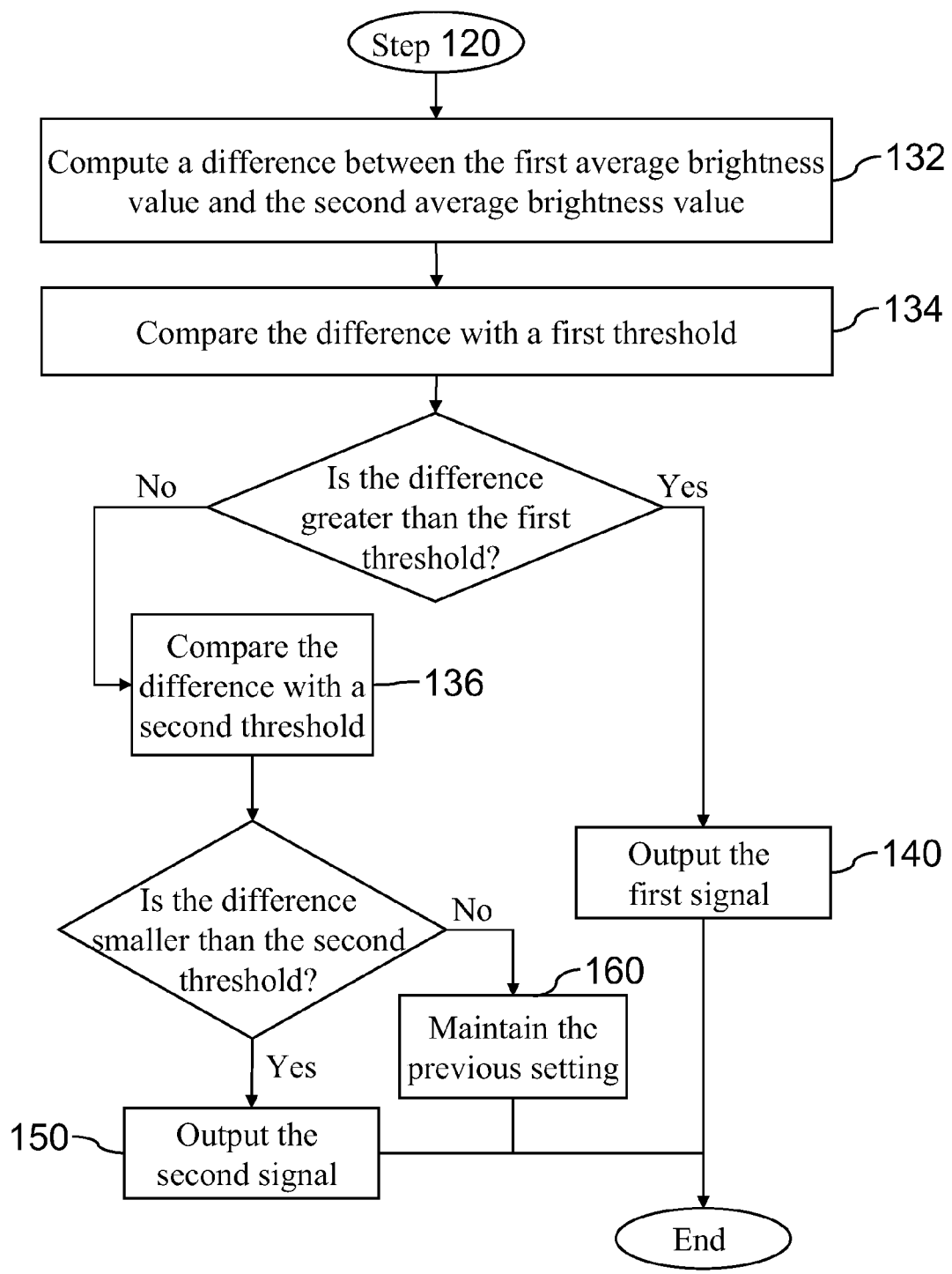
FIG. 9 shows an embodiment of Step 130.

Further referring to FIG. 9, the computing unit 232 computes the average brightness value of the K pixels captured from each scanning (Steps 110 and 120), and computes a difference between two average brightness values obtained by two adjacent times of scanning (Step 132). In other words, the computing unit 232 computes the average brightness value of the K pixels captured by the K sensing units in the N sensing units from the i$^{th}$ scanning, to obtain the first average brightness value (Step 110), and computes the average brightness value of the same K pixels captured by the K sensing units from the (i+1)$^{th}$ scanning, to obtain the second average brightness value (Step 120). Afterwards, the computing unit 232 computes the difference between the first average brightness value and the second average brightness value (Step 132).

The first comparison unit 234 compares the difference computed by the computing unit 232 with a preset first threshold (Step 134), and outputs the first signal when the difference is greater than the first threshold (Step 140). Further, the second comparison unit 236 compares the difference computed by the computing unit 232 with a preset second threshold (Step 136), and outputs the second signal when the difference is smaller than the second threshold (Step 150). Otherwise, the previous setting corresponding to the placing state of the optical mouse 200 is maintained.

In the above steps, the comparison of the difference with the first threshold is performed first, and the comparison of the difference with the second threshold is performed only when the difference is not greater than the first threshold. However, this determination order is not limited to the present invention. In other words, the comparison of the difference with the second threshold may be performed first, and the comparison of the difference with the first threshold is performed only when the difference is not smaller than the second threshold. Alternatively, the comparison of the difference with the first threshold and the comparison of the difference with the second threshold may be performed at the same time. Similarly, the determination order of the brightness change as shown in FIG. 1 is also not limited to the present invention. The precedence order of the determination may vary according to actual requirements.

In view of the above, according to the lift detection method for the optical mouse and the optical mouse with the lift detection function of the present invention, the sensing values of part of the sensing units are used to determine whether the optical mouse is lifted. Moreover, when it is further detected that the optical mouse is in the lift state, the first signal is generated, and the optical mouse stops the output of a displacement track; and when it is detected that the optical mouse restores to the normal use state, the second signal is generated, and the optical mouse recovers the output of the displacement track. In this manner, whether the optical mouse is lifted is determined without adding hardware components, and false determination caused by the lift of the optical mouse is avoided without increasing hardware cost.

What is claimed is:

1. A lift detection method for an optical mouse, applicable to an optical mouse, wherein the optical mouse comprises an optical source and an image sensor, the image sensor has a sensing surface formed by N sensing units, and the image sensor uses light rays generated by the optical source to continuously scan and capture a plurality of images corresponding to an optical field of a working plane facing the sensing surface, wherein N is an integer greater than 1, the method comprising:
  computing an average brightness value of K pixels captured by K sensing units, which are among the N sensing units, from an i$^{th}$ scanning, to obtain a first average brightness value, wherein K is a positive integer smaller than N, and i is a positive integer;
  computing an average brightness value of the K pixels captured by the K sensing units from an (i+1)$^{th}$ scanning, to obtain a second average brightness value; and
  determining a brightness change of the K pixels in the two images captured from the i$^{th}$ scanning and the (i+1)$^{th}$ scanning according to the first average brightness value and the second average brightness value, wherein when the brightness change is from dark to bright, a first signal indicating that a placing state of the optical mouse is a lift state is output.

2. The lift detection method for the optical mouse according to claim 1, wherein the step of determining the brightness change comprises:
  computing a difference between the first average brightness value and the second average brightness value;
  comparing the difference with a first threshold, to determine whether the difference is greater than the first threshold; and
  outputting the first signal, when the difference is greater than the first threshold.

3. The lift detection method for the optical mouse according to claim 1, further comprising:
  setting a flag signal according to the placing state of the optical mouse; and
  controlling an output of a displacement corresponding to each image according to the flag signal,
  wherein when the placing state of the optical mouse is the lift state, the flag signal is set according to the first signal, so that the optical mouse does not output the displacement corresponding to the image captured from the (i+1)$^{th}$ scanning.

4. The lift detection method for the optical mouse according to claim 1, further comprising:

not generating a displacement corresponding to the image captured from the $(i+1)^{th}$ scanning according to the first signal, when the placing state of the optical mouse is the lift state.

5. The lift detection method for the optical mouse according to claim 3, wherein when the brightness change is from bright to dark, a second signal indicating that the placing state of the optical mouse restores to a normal use state is output, and the flag signal is set according to the second signal, so that the optical mouse outputs the displacement corresponding to the image captured from the $(i+1)^{th}$ scanning.

6. The lift detection method for the optical mouse according to claim 1, wherein when the brightness change does not occur, the previous setting corresponding to the placing state of the optical mouse is maintained.

7. An optical mouse with a lift detection function, comprising:
   an optical source, for generating light rays to a working plane;
   an image sensor, having a sensing surface formed by N sensing units, and using the light rays generated by the optical source to continuously scan and capture a plurality of images corresponding to an optical field of the working plane facing the sensing surface, wherein N is an integer greater than 1; and
   a processing module, corresponding to K sensing units, which are among the N sensing units, and used for selectively outputting a first signal and a second signal according to a brightness change of the K sensing units between two images captured by the image sensor from an $i^{th}$ scanning and an $(i+1)^{th}$ scanning, wherein K is a positive integer smaller than N, and i is a positive integer,
   wherein when the brightness change is from dark to bright, the processing module outputs the first signal indicating that a placing state of the optical mouse is a lift state; and
   when the brightness change is from bright to dark, the processing module outputs the second signal indicating that the placing state of the optical mouse restores to a normal use state.

8. The optical mouse with the lift detection function according to claim 7, wherein the processing module comprises:
   a computing unit, for obtaining a difference between a first average brightness value and a second average brightness value, wherein the first average brightness value is an average brightness value of K pixels captured by the K sensing units, which are among the N sensing units, from the $i^{th}$ scanning, and the second average brightness value is an average brightness value of the K pixels captured by the K sensing units, which are among the N sensing units, from the $(i+1)^{th}$ scanning;
   a first comparison unit, for comparing the difference with a first threshold, and outputting the first signal when the difference is greater than the first threshold; and
   a second comparison unit, for comparing the difference with a second threshold, and outputting the second signal when the difference is smaller than the second threshold.

9. The optical mouse with the lift detection function according to claim 7, further comprising:
   a register, for setting a flag signal in response to the first signal, so that the optical mouse does not output a displacement corresponding to the image captured from the $(i+1)^{th}$ scanning.

* * * * *